350-3.68
SR
OR 3,614,191

United States Patent

[11] 3,614,191

[72] Inventors Mituhito Sakaguchi;
Nobuo Nishida, both of Tokyo, Japan

[21] Appl. No. 812,069
[22] Filed Apr. 1, 1969
[45] Patented Oct. 19, 1971

[73] Assignee Nippon Electric Company, Limited
Tokyo, Japan

[32] Priority Mar. 29, 1968, Mar. 29, 1968, Mar. 29, 1968
[33] Japan
[31] 43/20907, 43/20908 and 43/20909

[54] ASSOCIATIVE MEMORY EMPLOYING HOLOGRAPHY
11 Claims, 13 Drawing Figs.

[52] U.S. Cl. .......... 350/3.5, 340/173, 350/150
[51] Int. Cl. .......... G02b 27/22
[50] Field of Search .......... 350/3.5, 150; 340/173

[56] References Cited

UNITED STATES PATENTS

| | | | |
|---|---|---|---|
| 3,542,448 | 11/1970 | Reynolds et al. .......... | 350/3.5 |
| 3,329,474 | 7/1967 | Harris et al. .......... | 350/150 |

FOREIGN PATENTS

| | | | |
|---|---|---|---|
| 451,571 | 2/1968 | Switzerland .......... | 350/3.5 |

*Primary Examiner*—David Schonberg
*Assistant Examiner*—Robert L. Sherman
*Attorney*—Ostrolenk, Faber, Gerb & Soffen

ABSTRACT: An associative memory employing holographic techniques. During read-in first and second space modulated beams are each split into true and complementary groups of binary modulated beams. The resulting beam groups are caused to interact with one another to form a hologram. Upon readout, one or more digit positions are caused to scan many of the patterns of the hologram. Those patterns in the hologram having digit positions which coincide with the interrogating digit positions are readout of memory in their entirety (i.e. both the coincident digit positions and the remaining digit positions of a pattern are readout of memory).

INVENTORS
MITUHITO SAKAGUCHI
NOBUO NISHIDA
BY
OSTROLENK, FABER, GERB & SOFFEN
ATTORNEYS

INVENTORS
MITUHITO SAKAGUCHI
NOBUO NISHIDA
BY
OSTROLENK, FABER, GERB & SOFFEN
ATTORNEYS

ASSOCIATIVE MEMORY EMPLOYING HOLOGRAPHY

This invention relates to an associative information storage system employing holography.

The rapid increase in the amount of information to be processed by electronic data processors has created a great need for high-density, high-capacity memories such as the so-called file memories.

Conventional memories of this type mainly depend on the addressed memory system. In those systems, the information is stored at a specific address of the memory. To have access to the stored information, the data processor should give first the address specific thereto. In other words, the write-in and readout can not be carried out without giving addresses, which are respectively specific to the mutually different data and which have nothing to do with the content of the stored data. Under these circumstances, it is the practice at present that a large part of the hardware and software of data processors is occupied by the address information necessary for the write-in and readout. Particularly in the case of information retrieval such as data classification or word-to-word translation, where those particular data are selected from various stored data which coincide with the interrogating data, the involvement of addresses in write-in and readout of the data to and from memories becomes detrimental to the efficiency of the memory system as a whole. This has been one of the restrictions placed on the data handling capacity of the conventional data processors.

To overcome this difficulty, the associative memory system has been proposed. In this system, the content of the stored data itself serves as a clue to provide access thereto. More particularly, therefore, the associative memory may be called data addressed memory or content addressable memory, which means that the stored data are accessible resorting to the contents of the data and not to the addresses given thereto.

The principle of the associative memory is analyzed as follows.

It is well known that the coincidence of a binary digit $A_i$ ($i$ =1, 2, 3,....) of a digital information with a corresponding digit $B_i$ can be confirmed by performing an "exclusive OR" logical operation upon the two. More specifically, if the logical sum $X_i$ given by $X_i=A_i\cdot\overline{B}_i+\overline{A}_i\cdot B_i$.....(1), is "0," the coincidence of $A_i$ with $B_i$ is recognized. In other words, the equation (1) means that the summation $X_i$ takes the value "0" only when both the bits $A_i$ and $B_i$ are either "1" or "0." To generalize, the coincidence of the corresponding bits of information A and B is confirmed when the logical product M given by $\overline{X}_1\cdot\overline{X}_2\cdot ....\overline{X}_i\overline{X}_m=M$.....(2) takes the value "1," where $X_i$ represents the complementary value of $X_i$. As is well known however, a hardware system for carrying out the logical operation of equation (2) is inevitably very complicated. Instead of direct logical operation of this equation, therefore, a complementary value $\overline{M}$ of M given by $X_1+X_2+....+X_i+....+X_n=\overline{M}$...(3) is usually taken. In this case, the detection at a simple logic circuit of the noncoincidence leads to recognition of the coincidence of the corresponding bits of A and B.

Assuming that the information A be the stored data and B be the interrogating data, the associative memory is so constructed that the logical operation of equations (1) and (3) is performed by a hardware to select the data A which coincides with the interrogation data B. Since it is the common practice that the data A is selected from a great number of data with data B used as a key, the data B is usually smaller in number of binary digits than the data A. In other words, only a preselected number of digits among the total digits of data A is usually subjected to checking for coincidence with the corresponding digits of the interrogation data B. This does not means, however, that the interrogation by the equal-numbered digits should be excluded from consideration.

The result of the information retrieval is recognized as a noncoincidence state, a single-coincidence state involving only one selected data, or a multicoincidence state involving more than one selected data. In the case of the single-coincidence state, the retrieved data is read out as it is, while in the multicoincidence state, all the data are read out in the time-shifted relationship through the process of the ordered retrieval to be described later.

Among the conventional associative memories based on the foregoing principle, in which all or a part of the content of the stored data is subjected to the logical operation for the purpose of the retrieval of data, there is one proposed by Bell Telephone Laboratories and published in Japan under Patent Publication No. 21900/68. This system employs magnetic thin film, magnetic cores, and other memory devices as the storage elements. Another proposal published by R. Igarashi in the Proceedings of Spring Joint Computer Conference, 1967, P. 499–506 relies on MOS-type transistors. The disadvantage common to these conventional associative memories is that they are very costly to manufacture despite their rather limited storage capacity, mainly because virtually a doubled number of memory elements are required to make the associative memory feasible. To state more specifically with regard to the BTL proposal, one bit of data, to be stored in the "associative" fashion, requires a quantity of magnetic core memories which is 2 to 4 times as great as the quantity required in regular nonassociative memories. On the other hand, since the information processing system such as data retrieval or word-to-word translation system can not be put into practical use until the associative memory of sufficiently high capacity is employed, the manufacturing cost per bit of the associative memory should be as low as possible.

It is the object of the present invention therefore to provide an associative memory which is suited for use as a high-density, high-capacity memory and which does not cause a substantial increase in the manufacturing cost.

This invention is based on the application of the technique of holography to the associative memory.

The general description of holography has been given in various publications. Those descriptions in The Bell Laboratories Record, Apr. issue, 1967, pages 102–109; The Bell System Technical Journal, July–Aug. issue, 1967, pages 1,267–1278; and IBM Technical Disclosure Bulletin, Vol. 8, No. 11 (Apr. 1966), pages 1,581–1,583 are a few examples among them. Particularly since the second and third ones of the mentioned publications generally describe the application of the principles of holography to the regular nonassociative memories, only a brief description will be given here as to the holography.

A hologram is produced by exposing a photographic plate to an interference pattern formed between coherent laser light reflected from or transmitting through a subject and reference coherent light. The reflection or transmission at the subject may be termed a space modulation applied to the subject light wave. Since the interference pattern includes information as to the subject (or the modulating signal), it can beheld as a spatial carrier wave. Therefore, the hologram may be said to be a recorded spatial carrier wave modulated in amplitude and phase by the modulating signal, the i.e., subject. Reproduction of the recorded information is performed by illuminating the hologram with coherent reference light. In this illumination stage, the hologram serves as a diffraction grating to form a diffraction figure of the recorded subject.

As a result of the extensive study of the above-mentioned simple form of hologram, it has been found that various functions are derived by space-modulating the reference light wave as well as the subject light wave. In The Marconi Review, First Quarter 1967, pages 41–48, a character recognition system is described, in which a reference light wave is also space-modulated by means of a "code plate mask." Also, the above-mentioned paper published in Bell Laboratories Record suggests on page 107 that the modulation placed on both the reference beam and the subject beam brings about various functions applicable to character recognition, telephone directories and others. As is shown by these example, research and development are under way as to various holography-employing system in which the modulation is performed on both the reference and subject light beams.

A brief analysis of the formation of holograms and the reproduction of the recorded data will be given hereunder as to the case where both the reference and subject waves are subjected to space modulation.

Following the notations given on pages 40 to 41 of the above-mentioned paper of the Marconi Review, let one beam, say the above-mentioned "reference" beam, be $$A(x,y)=a(x,y)\exp[j\Phi(x,y)] \quad .....(4)$$

where $a(x,y)$ is the amplitude and $\Phi(x,y)$ is the phase of the light at a point $(x,y)$ on the photographic plate, and let the other beam similarly be $$B(x,y)=b(x,y)\exp[j\Phi\{\alpha x+\psi(x,y)\}] \quad .....(5)$$

This beam $B(x,y)$ is at an angle $\theta$, determined by $\alpha$, to the beam $A(x,y)$. The relation between $\theta$ and $\alpha$ is given by $\alpha=2\pi \sin\theta/\lambda$, where $\lambda$ is the wavelength of the light wave. The total light intensity P on the photographic plate is given by $$\begin{aligned} P&=|A(x,y)+B(x,y)|^2 \\ &=|a(x,y)\exp[j\Phi(x,y)]+b(x,y)\exp\{j[\alpha x+\psi(x,y)]\}|^2 \\ &=a(x,y)^2+(x,y)^2+a(x,y)b(x,y)\exp[j(\alpha x+\psi-\Phi)] \\ &\quad +a(x,y)b(x,y)\exp[-j(\alpha x+\psi-\Phi)] \quad .....(6) \end{aligned}$$

When the plate is developed, the transmission is directly proportional to P.

When the hologram with the pattern P is illuminated with the beam $A(x,y)$, the light transmitted by the plate will have the intensity distribution T defined by $$\begin{aligned} T&=[a^2+b^2+ab\exp[j(\alpha x+\psi-\Phi)]+ab\exp[-j(\alpha x+\psi-\Phi)]\, a\exp(j\Phi) \\ &=a(a^2+b^2)\exp(j\Phi)+a^2b\exp[j(\alpha x+\psi)]+a^2b\exp[-j(\alpha x+\psi+2\Phi)] \quad .....(7) \end{aligned}$$

, letting $a(x,y)$ by written as a, etc. The second term of the expression (7) is similar to B except for the factor $a(x,y)^2$. This means that the wavefromt leaving the hologram has exactly the same shape as B but the amplitude of light is modulated across the wave front by $a(x,y)^2$. If the factor $a(x,y)^2$ is substantially equal to unity (which means that B is regarded as a series of point sources), each point source will have a spherical wave front of constant amplitude. Similarly, upon illumination with the beam B of the hologram P, A is reproduced.

This invention is based on the application to the associative memory of the above-mentioned principle of the dual-modulation-type hologram, in which the interference pattern between a first light beam modulated with first data and a second light beam B modulated with second data is recorded on the photographic plate, and in which the plate is illuminated in reproduction with the beam A or B employed as an interrogation data to retrieve the data of the counterpart B or A. When viewed from the technology of the associative memory, the retrieval of one light wave component with illumination by another light wave component is exactly the function aimed at by the associative memories. As will be readily understood by engineers in this technical field, the interrogation data may be other than A or B. Any arbitrary data may be introduced as the interrogation data in place of A or B.

In the associative memory system of the present invention, in its write-in stage, a first light beam is space-modulated by a first group of digital data and converted into a plurality of pairs of thin light beams, each pair of which represents "1" and "0" respectively by the presence of a selected one of the pair Similarly a second beam is space-modulated by a second group of digital data into a plurality of light beams. These first and second space-modulated beams are directed to a restricted region on a photographic plate with a predetermined angle formed between the beams. Thus, the interference pattern formed between the beams is recorded on the plate. This operation is repeated until all the possible word combinations of the first and second data to be recorded form a complete hologram on the plate.

To state more specifically, each bit "0" and "1" of the first type of data to be stored is represented by separate light beams so as to record the complementary value of each bit. In contrast to the conventional hologram memory in which the bits "1" and "0" of data to be stored are simply represented by presence and absence of the light beams, respectively, and in which a single unit storage surface of the hologram is assigned to one bit "1" or "0," the present system assigns two unit storage surfaces to one bit "1" or "0," enabling bit "1" to be stored on one of the two unit surfaces while its complementary value "0" be stored on the other of the same unit surfaces. Thus, with the present system, each digit of the data is recorded along with its complementary value, "0" for true digit "1," and "1" for true digit "0." The recording of digits in this fashion enables the readout of the "associative" type as will be detailed later.

Since the complementary value is recorded along with the true value as to each digit of data to be stored, the number of bits storable on a fixed area of the surface of the photographic plate may probably be smaller than the regular nonassociative memories, it is admitted. However, the data storage device of the holography type which has been proposed to date still has great room or tolerance in terms of the resolving power of the light deflection means to be mentioned later. In other words, those conventional systems assign sufficiently large and excessive areas to each bit of data to be stored. It follows therefore that storage of the complementary value along with the true value as to each bit does not necessarily result in the decrease in the number of the bits storable in a fixed area on the surface of the hologram.

By way of illuminating the thus produced hologram, area by area corresponding to one word of the stored data, the readout of the stored data is carried out. In the stage of the data retrieval to be performed in advance of readout, the plate is illuminated with the interrogation beams representative of the "complementary" combination of bits of the interrogation data. If the recorded data subjected to interrogation includes at least one bit noncoincident with the corresponding bit of the interrogation data, the interrogation beam is allowed to pass through the hologram plate to form the diffraction figure of the illuminated data. In contrast, if the interrogated data does not include any bit noncoincident with the corresponding bit of the interrogation data, the interrogation beam is not allowed to pass through the plate. No diffraction figure is formed in this case, accordingly. Those interrogated data on the plate which do not allow the interrogation beam to pass therethrough are sensed by means of photoelectric conversion means to produce a control signal to illuminate all the areas assigned to the interrogated and thus retrieved data. Upon illumination this time, the retrieved data is read out in the form of the diffracted figure.

Now the invention will be described in conjunction with the accompanying drawings in which:

FIG. 1 schematically shows in block form an embodiment of the present invention in its write-in phase;

FIG. 2*a* shows a longitudinal sectional view of a part of the embodiment of FIG. 1;

FIG. 2*b* shows an end view of the embodiment of FIG. 2*a*;

FIG. 3*a* shows a similar view of another part of the embodiment;

FIG. 3*b* shows an end view of the embodiment of FIG. 3*a*;

FIG. 4*a* shows a perspective view of still another part of the embodiment;

FIG. 4*b* shows a side view of a portion of the embodiment of FIG. 4*a*.

Figure 8:
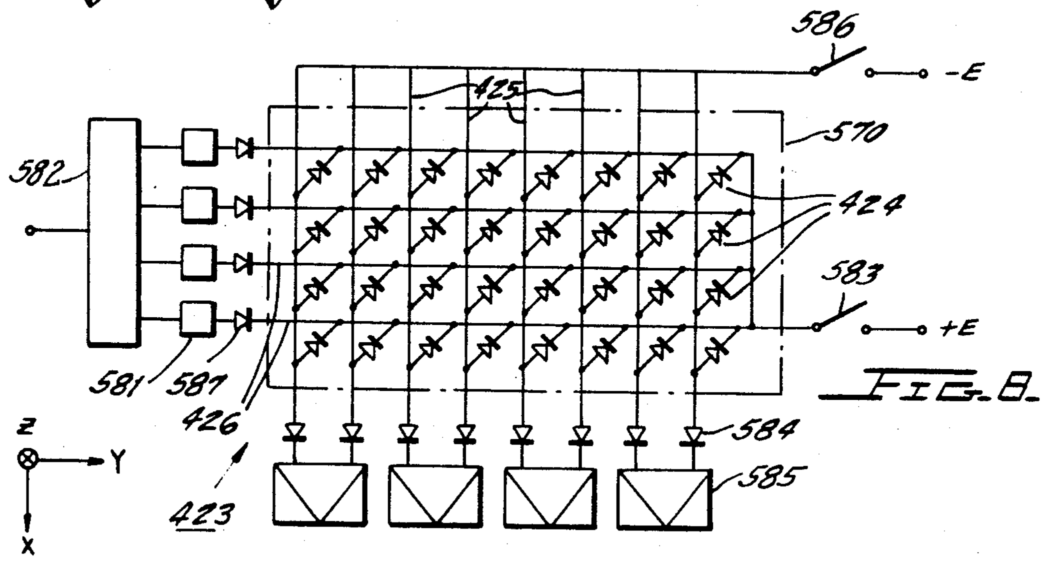
FIG. 8 shows a structure of a part of the embodiment of FIG. 7.
Figure 9B:
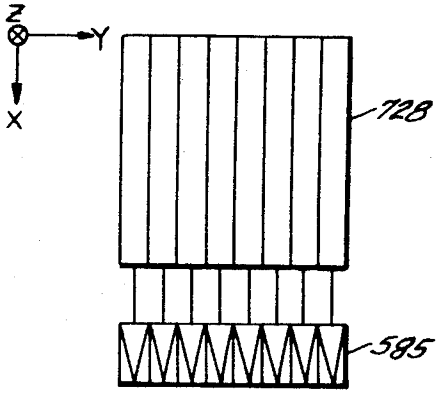
Figure 9A:
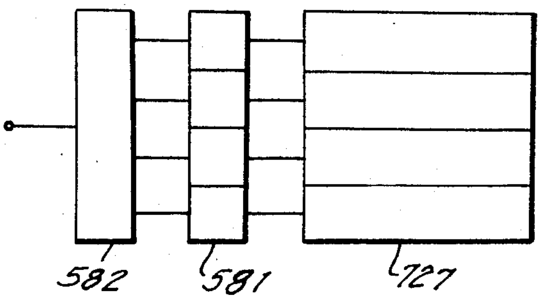

FIGS. 9*a* and 9*b* are plan views showing a modification of the element shown in FIG. 8.

Figure 1:
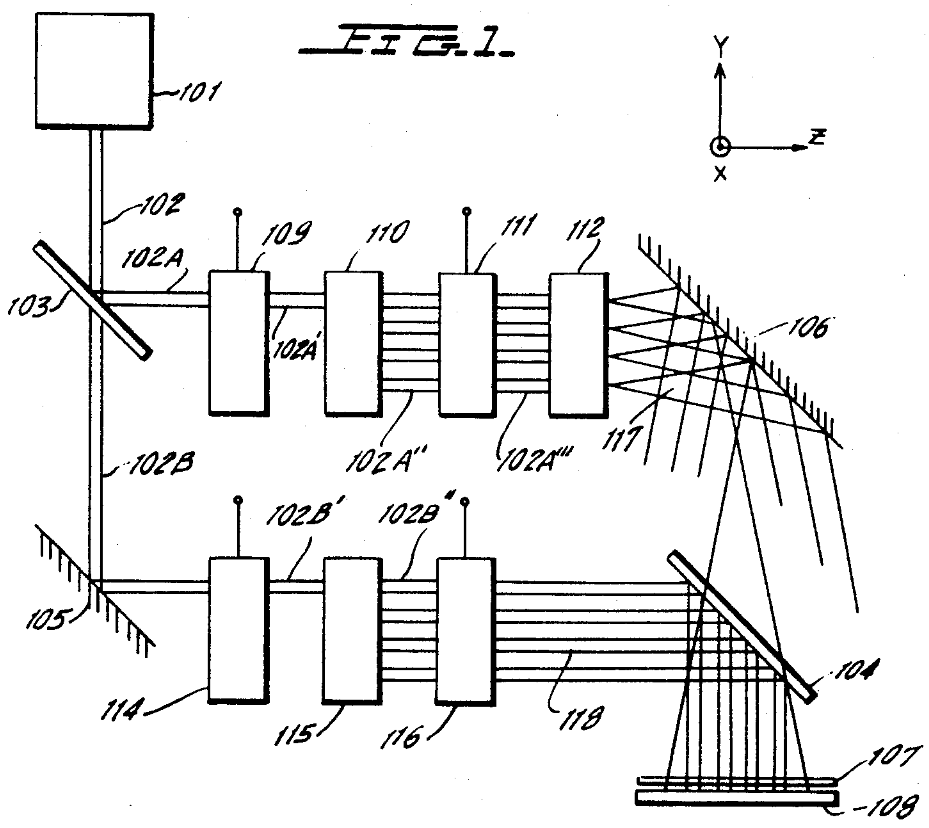

In the embodiment of FIG. 1 shown in its write-in phase, coherent light beam 102 supplied from a laser device 101 is split into two parts by a beam splitter 103 placed at an angle of 45° to the beam 102. The reflected component 102A is led to an X-deflecting means 109, which causes the shift of the optical path of the beam 102A in the direction of X-axis in response to the digital deflection signal supplied thereto (This deflecting means 109 will be detailed later). The output beam 102A' of the deflecting means 109 is then distributed in Y-axis direction by a Y-distributor 110 (to be described later) into a plurality of light beam 102A''. These beams are then applied to a selective masking means 111 which space-modulates, as will be described later, the input beams 102A'' in response to a first digital data supplied thereto. The space modulated light beams 102A'' are then caused to diverge in the Y-direction by a divergence means 112 (to be detailed later) into the form of the diverging light beams 117. The beams 117 are then reflected by a reflector 106 and illuminate the surface of the photographic plate 108 through a half silvered mirror 104 and a saturable dye plate 107.

The other component 102B passing through the beam splitter 103 is totally reflected by a reflector 105 and led to a X-deflecting means 114 which has a quite similar structure to the X-deflecting means 109 and which is supplied with the same X-deflection signal. The output beam 102B' is then distributed in Y-axis direction by a Y-distributor 115 similar to distributor 110. The Y-distributed output beams 102B'' are then subjected to the space-modulation at another selective masking means 116 similar to means 111 in response to a second digital data supplied thereto. In contrast to the modulated beams 102A''' which are modified into diverging beams 117 by divergence means 112, the modulated output beams 118 of the selective masking means 116 illuminate, with the parallel relationship between them kept unchanged, the photographic plate 108 through dye plate 107 after being reflected by the half silvered mirror 104. It is to be noted here that the half silvered mirror 104 is placed at an angle, slightly different from 45°, to the parallel modulated beams 118. Reflectors 105 and 106 are parallel to the beam splitter 103.

Since the output light beams 117 modulated by the first data are diverging while the beams 118 modulated by the second data are parallel to one another, the interference pattern formed on the dye plate 107 between the beams 117 and 118 is of the Fraunhofer type. Because of the saturable dye plate 107 placed on the photographic plate 108, however, only those portions of the interference pattern which are illuminated by components of both beams 117 and 118 are recorded on the plate 108. The formation of the interference pattern on the photographic plate 108 will be further detailed later. Though not particularly mentioned in the foregoing, the saturable dye plate 107 contains saturable dye material of the type described in IBM Journal, Vol. 8, No. 2 (Apr. 1964), pages 182–184. This material has such property that for a light beam of an intensity lower than a threshold value it remains opaque, while for a light beam of the intensity exceeding the threshold is becomes transparent. In the present system, the threshold is set at such a value that the coincident illumination with two beam components cause the plate 107 to be transparent while the illumination with either of the beams is insufficient to make it transparent.

Figure 2A:
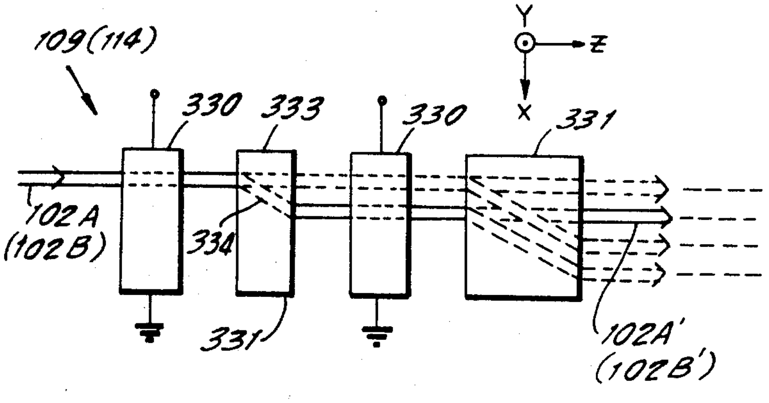

FIG. 2*a* shows the longitudinal cross-sectional view of details of the X-deflecting means 109, which comprises a plurality of combinations of a crystal plate 330 having the electrooptical effect of the transverse field type such as lithium tantalate $LiTaO_3$, and a birefringence prism 331, those combinations being disposed in series with respect to the light path of the beam 102A lying in the direction of Z-axis (The light deflector of this kind is analyzed in general in PIEEE, vol 54, No. 10 (Oct. 1966) pages 1,419–1,429. Therefore, only brief description will be given here). To ease illustration, only two combinations of elements 330 and 333 are employed in this example to select one out of four optical paths in XY plane. Upon application of a digital voltage across the crystal plate in a direction perpendicular to the light path, the plane of polarization of the beam 102 is rotated by 90° to become an extraordinary light ray for the birefringence prism 331. The polarization-plane-rotated beam takes the light path 334 for the extraordinary rays instead of the path 333 for the ordinary rays which correspond to the unrotated beam. Thus, upon application of the digital deflection voltage "1," the light beam 102A takes the light path 334 while the same beam 102A takes the path 333 upon application of the voltage "0." A similar separation of light paths takes place in the succeeding stage as to the output light beam having passed through the light path 333 or 334. Thus, the input light beam 102A emerges from the deflecting means 109 in the Z-axis direction at one point selected out of four possible emerging points on the X-axis As has been mentioned above, the number of the possible beams emanating points may be greater than four. The number can be easily increased by employing more than two combinations of the crystal plate 330 and prism 331. The number 4 is assumed hereunder for ease of illustration. The above-described structure of X-deflector 109 is common to another deflector 114 assigned to light beam 102B.

Figure 2B:
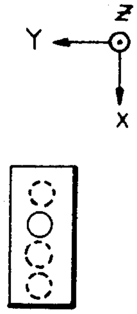

In FIG. 2*a*, it is assumed that the digital voltage "1" is applied only at the first-stage crystal plate 330. This makes the light beam 102A to take the second light path numbered from the top of the drawing, as shown with solid lines therein. The output surface of the second-stage birefringence prism 331 from which the light beams emanate is as shown in FIG. 2*b*, wherein the solid line circle shows the light beam emerging under the above assumption.

Figure 3A:
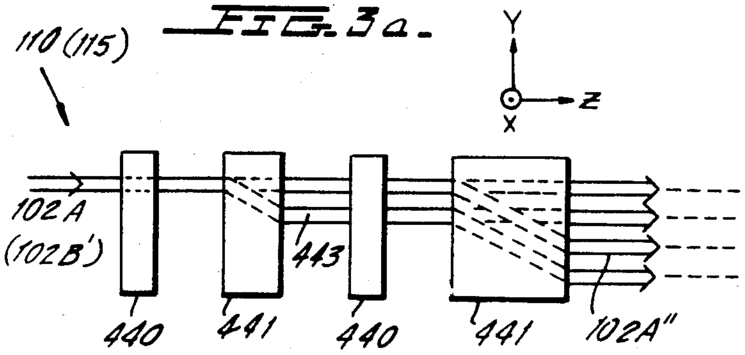
Figure 3B:
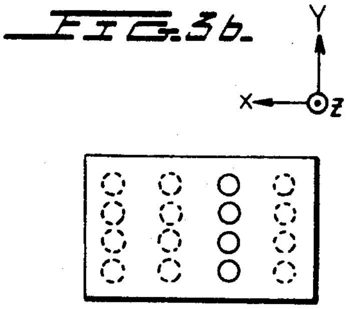

Referring to FIG. 3*a*, the Y-distributing means 110 has two combinations of a ¼ plate 440 and a birefringence prism 441 disposed in series with respect to the light path. The plate 440 made of a mica plate converts the input ordinary ray component into an elliptically polarized rays. Thus, the first-stage birefringence prism produces a pair of parallel light beams of equal intensity. These beams are respectively split into two at the second combination of the elements 440 and 441, producing four parallel beams as shown with solid lines. In this case also, the number of the combinations of 440 and 441 is assumed to be two. Therefore, only four parallel beams emerge from the output surface of the second-stage birefringence prism 441 as to one input beam, as line in FIG. 3*b*. The solid line circles in FIG. 3*b* show emanating parallel light beams corresponding to the single solid-lined circle in FIG. 2*b*. As will be seen, each of the elements 440 and 441 has a certain area in XY plane for accommodating the X-deflected and Y-distributed beams. It should be noted in this connection that the axes in FIG. 2 of the rectangular coordinate system are different from those in FIG. 3. The structure of the above-described Y-distributing means 110 is common to another Y-distributing means 115 in FIG. 1.

Figure 4A:
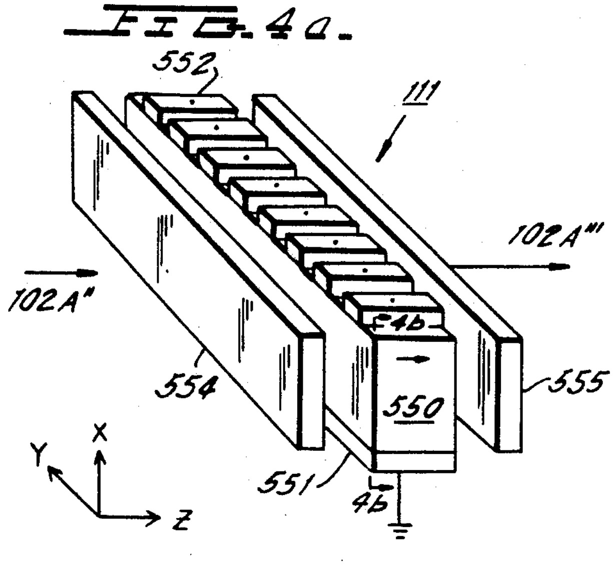
Figure 4B:
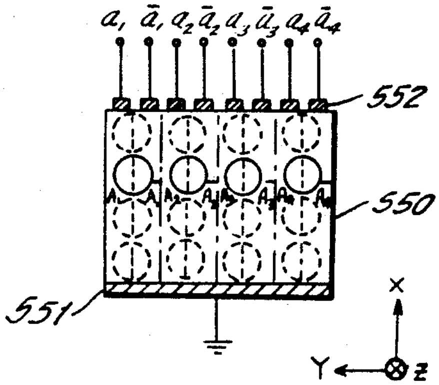

Referring to FIG. 4*a*, which shows a perspective of the selective masking device 111, the parallel light beams 102A'' (shown by a single arrow) which have been produced through the X-deflection at deflector 109 and Y-distribution at Y-distributing means 110 are directed through a polarizer plate 554 and one side surface of a crystal piece 550 having the electrooptical effect of the transverse field type. The crystal piece 550 may be of the material similar to the crystal 330 of FIG. 2*a*. On the output side of the crystal piece 550, an analyzer plate is disposed in parallel to the polarizer 554. The optical axis of the analyzer 555 is at a right angle to that of the polarizer 554. The lower end surface of the crystal piece 550 has a film electrode 551 attached in ohmic contact thereto. On the other hand, the upper end surface has eight separate electrodes 552 attached to the crystal piece 550 in ohmic contact, as shown in FIG. 4*b*. By these separate electrodes, the crystal piece 550 is divided into eight regions $A_1$, $\overline{A}_1$, $A_2$,...., and $\overline{A}_4$. In response to a digital voltage applied across one or more of the electrodes 552 and the common electrode 551, the plane of polarization of the input linearly polarized light supplied through the polarizer is rotated only at the voltage-applied region so that the rotated components may be allowed to pass through the analyzer 555.

The relationship between the above-mentioned regions $A_1$, $\bar{A}_1$, $A_2$,..., and $\bar{A}_4$ and the illuminating light beams 102A'' is as shown in FIG. 4*b*. The four parallel beams 102A'' shown in FIG. 3*b* by solid and dotted lines illuminate the input surface of the crystal piece 550 as shown. It is to be noted that the parallel beams 102A'' illuminate every two neighboring regions $A_1$ and $\bar{A}_1$; $A_2$ and $\bar{A}_2$; $A_3$ and $\bar{A}_3$; and $A_4$ and $\bar{A}_4$, respectively. The selective masking or space-modulation at the masking means 111 is such that the digit "1" rotates the plane of polarization of the light beams to allow them to pass through the analyzer portion facing regions $A_1$, $A_2$, $A_3$, or $A_4$, while the digit "0" rotates the plane of polarization of the light beams so as to allow the component to pass through the analyzer portion facing regions $\bar{A}_1$, $\bar{A}_2$, $\bar{A}_3$, or $\bar{A}_4$. The regions $A_1$ and $\bar{A}_1$ are respectively assigned to a true and complementary values of a first digit "1" or "0." Similarly, the regions $A_2$ and $\bar{A}_2$ are respectively assigned to a true and complementary values of a second digit "1" or "0," etc.

Let the modulating data be, for example, (1 0 1 0), the digital voltages are applied only at the regions $A_1$, $\bar{A}_2$, $A_3$ and $\bar{A}_4$, thus allowing each half of the input parallel beams 102A'' to pass through the analyzer. It is to be noted here that the presence of the polarization-plane rotation of beams at regions $A_1$, $\bar{A}_2$, $A_3$, and $\bar{A}_4$ is accompanied by the absence of the same rotation of beams at regions $\bar{A}_1$, $A_2$, $\bar{A}_3$, and $A_4$. In other words, the space-modulation of four parallel beams with a code (1 0 1 0) means a simultaneous modulation with another code (0 1 0 1) complementary to the former.

The above-described structure of the selective masking means 111 is common to another masking means 116.

Figures 5, 6:
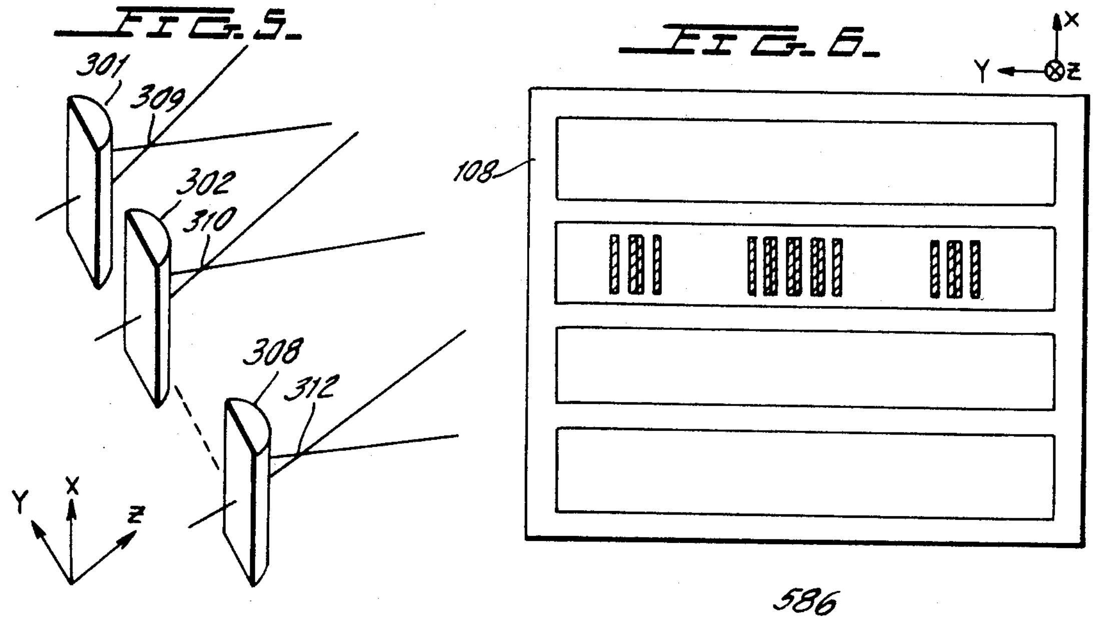
FIG. 5 shows a perspective view of still another part of the embodiment.
FIG. 6 shows an example of the interference pattern formed on the photographic plate.

The divergence means 112 for changing the output beams 102A'' to diverging beams 117 (FIG. 1) comprises eight cylindrical lenses 301, 302, 303, ...., and 308 which, as shown in FIG. 5, are in one to one correspondence to the regions $A_1$, $\bar{A}_1$, $A_2$, ...., and $\bar{A}_4$ of the masking means 111 (FIG. 4*a*). These lenses may be replaced with a lenticular plate which involves all the cylindrical lenses 301, 302, ...., and 308, as united into a plate. The length in the X-direction of these lenses may be comparable to the corresponding length or height of the crystal piece 550 of the selective masking means 111 (FIG. 4).

The output light beams 117 and 118 modulated respectively by first and second modulating data at selective masking means 111 and 116 form an interference pattern on the photographic plate 108 and are recorded there. By way of suitably selecting the X-directional point at X-deflectors 109 and 114 in response to a suitable X-deflection signal, numerous word combinations of first and second data can be recorded on separate sections on the photographic plate surface without moving the plate with respect to the selective masking means 111 and 116. In this way, on the plate 108, the interference patterns of a great number of word combinations each composed of a plurality of bits (4 bits are now assumed for convenience of description) arranged in the Y-direction are recorded side-by-side in the X-direction.

To state more specifically the spatial relationship between the interference patterns, it is assumed here that a word of the first data with an X-address given is composed of four bits ($a_1$ $a_2$ $a_3$ $a_4$) and that a corresponding word of the second data with the same X-address given it composed of four bits ($b_1$ $b_2$ $b_3$ $b_4$). Each of these bits $a_1$, $a_2$, $a_3$ ...., $b_3$, and $b_4$ takes a value "1" or "0." Assuming that the bits ($a_1$ $a_2$ $a_3$ $a_4$) are (1 0 1 0) as in the case of the foregoing example, the light beams 102A''' emanate from the regions $A_1$, $\bar{A}_2$, $A_3$, and $\bar{A}_4$ of the masking means 111 (FIG. 4) and fail to emanate from regions $\bar{A}_1$, $A_2$, $\bar{A}_3$, and $A_4$. Similarly, assuming that the bits ($b_1$ $b_2$ $b_3$ $b_4$) be (0 0 1 1), the space-modulated output beam 118 from the masking means 116, which has a structure quite similar to the masking means 111 (FIG. 4), emanate from regions $\bar{B}_1$, $\bar{B}_2$, $B_3$, and $B_4$ and not from regions $B_1$, $B_2$, $\bar{B}_3$, and $\bar{B}_4$ (Notation A in FIG. 4*b* is changed here to B for differentiating the space-modulation with the first data from that with the second data). These two groups of beams form a specific interference pattern in such a manner that $a_1$ is paired with $b_1$, $a_1$ with $\bar{b}_1$, $\bar{a}_1$ with $b_1$, $\bar{a}_1$ with $\bar{b}_1$, etc. More particularly, the pairs are formed by $(a_1+\bar{a}_1+a_2+\ldots+a_4+\bar{a}_4)$ $(b_1+\bar{b}_1+b_2+\ldots b_4+\bar{b}_4)$. This paired group forms eight discrete interference patterns on the saturable dye plate 107. Among these interference patterns, there are those portions where the modulated beams 117 and 118 are superimposed while either beam 117 or 118, to the exclusion of the other, illuminates the other portions. Transmitting through the saturable dye plate 107 of the interference pattern, therefore, produces the pattern of only the superimposed portions. In the above-mentioned example of word combination, therefore, the interference patterns are recorded only in the four groups of pairs $a_1$ $(\bar{b}_1+\bar{b}_2+b_3+b_4)$, $\bar{a}_2(\bar{b}_1+\bar{b}_2+b_3+b_4)$, $a_3(\bar{b}_1+\bar{b}_2+b_3+b_4)$, and $\bar{a}_4(\bar{b}_1+\bar{b}_2+b_3+b_4)$.

These combinations are schematically shown in the plate 108 of FIG. 6. The horizontal strips in blank represent the fact that other word combinations of the first and second data are recorded similarly in these spaces.

The steps will now be described of data retrieval and readout from the hologram prepared in the above-mentioned manner.

Figure 7:
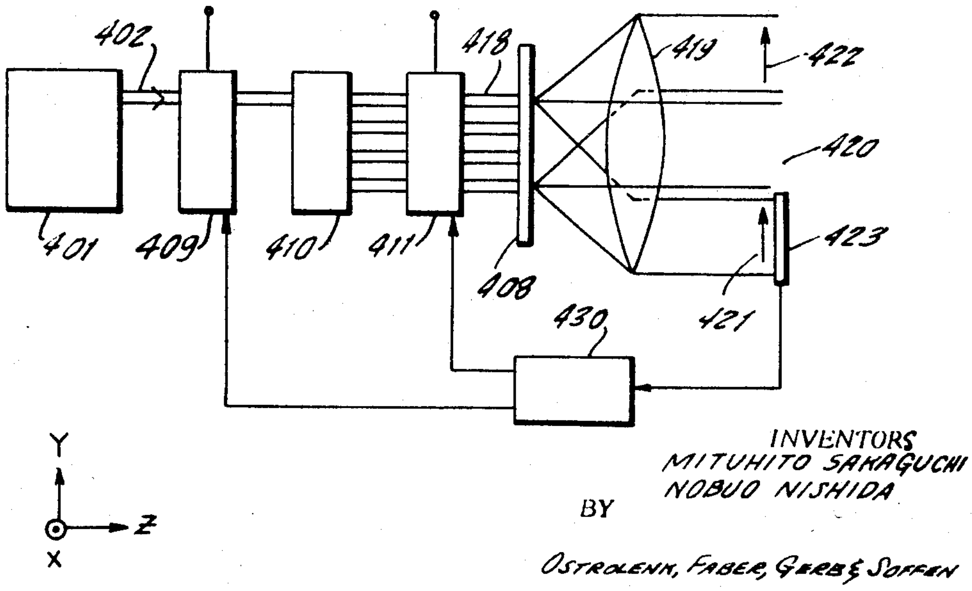
FIG. 7 is an embodiment of the present invention in its readout phase.

Referring to FIG. 7, the coherent light beam 402 generated at a laser device 401 is first subjected to X-deflection at the X-deflector 409 which has a structure quite similar to the X-deflector 109 shown in FIG. 2*a*. The deflected beam is distributed in the Y direction by a Y-distributor 410 which is quite similar to the Y-distributor 110 shown in FIG. 3*a*. The spacings between the X-deflected and Y-distributed beams are exactly the same as those output beams of Y-distributor 110 or 115 of FIG. 1. THe selective masking means 411 which is quite similar to the masking means 111 of FIG. 4 imposes space-modulation upon the output parallel beams of the Y-distributor 410, in response to the interrogation data supplied thereto. The beams are then selectively masked for the data retrieval purpose by the masking means 411. The space-modulated interrogation beams then illuminate the hologram plate.

As will be seen from the foregoing, the constituent parts ranging from the laser 401 to the selective masking means 411 are exactly the same as the part involving reflector 105 to selective masking means 116 of the embodiment in the write-in phase of FIG. 1. Therefore, this part of FIG. 1 may be used for data retrieval and readout in the time interval of no write-in requirement. In this connection, it should be taken into consideration that the X-deflector 410 (or 115 in FIG. 5) should selectively serve also as a X-distributor, because the interrogation beams should illuminate many words at the same time for attaining the high data retrieval speed. For this purpose, the polarization-plane-rotating digital voltage supplied to the X-deflector 409 is decreased in the retrieving interval by one half to effect the 45° rotation of the polarization plane. It will be apparent to the engineers in this technical field that such a voltage control is easily derived from the conventional circuit technology.

To state more specifically the process of data retrieval, let the interrogation data be (1 X X 0). This data requires that all those data should be selected from the stored data which have "1" in the most significant digit and "0" in the least significant digit. The digit portions marked by X are the so-called "don't care" bits which may be "1" or "0."

In response to the interrogation data (1 X X 0), the interrogation light beam should illuminate the hologram in the pattern (0 X X *1*) to satisfy the condition of the "associative" readout. To meet this requirement, the digital voltage is applied only at regions $\bar{C}_1$ and $C_4$ (Notation A in FIG. 4*b* is changed here to C to clearly show the difference of the modulating data). The interrogating beams (0 X X 1) simultaneously illuminate as many hologram patterns as possible. In this example, all the four recorded data are illuminated simultaneously.

The illuminating light beams are diffracted by the hologram serving as a diffraction grating, and form a pair of diffraction figures 421 and 422. Besides these diffraction figures, a direct transmission component is observed. However, the latter includes no data component. In the region where the figure 421 is formed, a photoelectric converter plane 423 is disposed. In this embodiment a lens 419 is interposed between the plate 408 and the plane 423 so that the diffracted light may be made parallel to the interrogating beams. For switching the retrieving phase to the readout phase, a control circuit 430 is connected to the plate 423, X-deflection circuit 409 and selective masking means 411.

Referring to FIG. 8 which shows the schematic plan view in the XY plane of the photoelectric converter plane 423, this converter comprises a plurality of photodiodes 424, a plurality of parallel column conductors 425 connecting the anodes of the diodes in common, a plurality of line conductors 426 connecting the cathodes of the diodes in common, a switch means 583 connecting all the line conductors to a positive constant voltage source +E, another switch means 586 connecting all the column conductors to a negative constant voltage source E, coincidence-detection circuits 581 are respectively coupled to the line conductors at their ends opposite to the switch 583, an ordered retrieval means 582 is coupled in common to the detection circuits 581, and the differential-type sensing amplifiers 585 are coupled via diodes 584 to every paired column conductors at their ends opposite to switch means 586.

The spacing between the diodes on the matrix 570 is determined on the basis of the bit interval of the diffraction figure obtained by illuminating the hologram plate with the interrogating beams. To make the "associative" readout or data retrieval possible, each pair of the photodiodes arranged in the column (Y) direction is assigned to one bit of the reproduced data and coupled in common to the sensing amplifier 585 through diodes 584. It will be apparent to engineers in this technical field that the photodiodes are maintained in the nonconductive state so long as they are not illuminated, while illumination thereof renders them conductive to cause the voltage change in the column and/or line conductors. The coincident detector 581 and sensing amplifier may be those well known in this technical field. The ordered retrieval means 582 may be of the type described in the above-mentioned paper (particularly in its FIG. 8) of the Proceedings of Spring Joint Computer Conference or IBM Journal, Jan. issue, 1962, pages 126–136.

Now, let the interrogation data be (1 X X 0) as assumed in the foregoing, then the interrogation beams emanating from the selective masking means 411 takes the form of (0 X X 1). This means that the interrogation beams emanate from those regions of analyzer plate 555 which correspond to regions $\overline{C}_1$ and $C_4$. Assuming also here that the interrogating data is to retrieve the above-mentioned word of the first data A, and that the search is made into the recorded interference pattern of the word combinations between first and second data $(a_1+\overline{a}_1+a_2+\overline{a}_2+....+\overline{a}_4)x(b_1+\overline{b}_1+b_2+\overline{b}_2+....+\overline{b}_4)$, only two illuminating beams, among the total illuminating beams, come into spatial coincidence with the recorded data $\overline{a}_1(b_1+\overline{b}_1+b_2+\overline{b}_2+....+\overline{b}_4)$ and $a_4(b_1+\overline{b}_1+b_2+\overline{b}_2+....\overline{b}_4)$. The former is the one emanating from the region $\overline{C}_1$, and the latter is the one from the region $C_4$. On the other hand, since the recorded interference pattern is representative of the paired word $(a_1+\overline{a}_2+a_3+\overline{a}_4)(\overline{b}_1+\overline{b}_2+b_3+b_4)$, the interrogating beam emanating from the region $\overline{C}_1$ is intercepted by the hologram plate 408 even if it illuminates the plate section assigned to $a_1$. Therefore, this beam does not form the diffraction figure. Similarly, the interrogating beam emanating from the region $C_4$ is intercepted by the plate 408 to produce no diffraction figure. As a consequence, no diffraction figure is formed for this first data (1 0 1 0) when interrogated by interrogation beams (0 X X 1). This is detected by the coincidence detection circuits 581 as no voltage change in the line conductor. This state is then recognized by the ordered retrieval means 582 as the coincidence state between the first data (1 0 1 0) and the interrogation data (1 X X 0). The output of ordered retrieval means 582 is then supplied to the control circuit 430 to produce a control signal for X-deflecting distributing means 409 and selective masking means 411, to cause the readout illuminating beams to emanate at the same X address from the selective masking means 411 all of the regions $C_1$, $\overline{C}_1$, $C_2$, $\overline{C}_2$, .... and $\overline{C}_4$. The diffraction figure is produced this time and the bits are read out by the amplifiers 585.

In the stage of the interrogation, the interrogating beams illuminate a number of the recorded word patterns all at one time It is quite possible therefore that a plurality of the coincidence detection circuits 581 sense the coincidence of the interrogation beams and the illuminated data. From the fact that the illumination with the interrogating beams has produced a diffraction figure it follows that the illuminated data include at least one bit noncoincident with the interrogation data (1XX0).

On the other hand, when the same interrogation data is to retrieve the second data (0011), the interrogation beam emanating from the region $\overline{C}$, illuminates the record section of $\overline{b}_1$, while the interrogation beam emanating from the region $C_4$ illuminates the record section $b_4$. Since the recorded word pair is $(a_1+\overline{a}_2+a_3+\overline{a}_4)(\overline{b}_1+\overline{b}_2+b_3+b_4)$, the interrogating beam from the region $C_1$ illuminates the recorded content $b(a_1+\overline{a}_2+a_3+\overline{a}_4)$ to form the diffraction figure $a_1+\overline{a}_2+a_3+\overline{a}_4$ at the corresponding X-address on the photodiode matrix 570. Similarly, the interrogating beam from the region $C_4$ illuminates the recorded content $b_4(a_1+\overline{a}_2+a_3+\overline{a}_4)$ to produce a diffraction figure $a_1+\overline{a}_2+a_3+\overline{a}_4$ at the same X-address of the photodiode matrix 570.

The diffraction figures are sensed word by word by the coincidence-detection circuits 581 connected to the line conductors (FIG. 8). As regards those words which have produced the diffraction figures when illuminated in the interrogating state, the read out beams are not directed at the readout stage, through control by the control circuit 430.

If a plurality of the recorded words are detected to be coincident with the interrogating data (1XX0), the ordered retrieval operation is performed at the circuit means 582 so that the readout may be carried out in a time-displaced relationship (see the above description of FIG. 8).

It has been assumed in the example given above that the interrogating data is (1XX0). This example implies that the present system is applicable to the data retrieval in which a plurality of data is selected with a key of only one or more bits. Another data retrieval may be selection of one information recorded in combination with another, with said another information used as a key. The latter example of the data retrieval may be termed translation.

To state more specifically this translation type data retrieval, it is assumed here that the first data (1010) is to be derived from the paired recorded first and second data (1010) (0011), with the second data (0011) employed as a key. FIrst of all, the interrogating digital voltage (1100) complementary to the interrogating data (0011) is respectively applied to the regions $C_1$, $C_2$, $\overline{C}_3$, and $\overline{C}_4$, to produce the interrogating beams (1100). Since the interference pattern is formed only at the paired first and second data $(a_1+\overline{a}_2+a_3+\overline{a}_4)(b_1+\overline{b}_2+b_3+\overline{b}_4)$, none of the interrogating beams is allowed to pass through the hologram plate. Thus, the coincidence of all the corresponding bits is detected by the photoelectric converter plate 423 to confirm that the first data (1010) is the retrieved word. Then, the readout beams are produced, through control by the control voltage from circuit 430, from all the regions at the same X address to enable the readout of the retrieved data (1010).

Although the number of bits of first and second data has beam assumed to be 4 in the foregoing, this number may be arbitrarily selected. Also, the number of words may be increased without limitation. The number of light beam groups each space-modulated with mutually different data may be greater than two.

If the output beam 102 of the laser device 101 has sufficiently large cross section in the embodiment of FIG. 1, the selective masking means 116 may be disposed immediately in front of the X-deflecting means 114, with an accompanying collimator means interposed between the means 116 and 114. This modification is applicable to the embodiment in FIG. 7 of the readout phase. The cylindrical lenses 301 to 308 of the divergence means 112 may be replaced with a matrix of spherical lenses, for allowing the light to diverge beams two-dimensionally. In this case, the X-address defined by the digital voltage supplied to the X-deflecting means 109 is not always the counter part X-address given to another X-deflecting means 114.

The crystal piece 330 and/or 550 may be replaced with other similar elements of the longitudinal field type such as KDP (potassium dihydrogen phosphate $KH_2PO_4$). Also, the X-deflectors in the embodiment may be the acousto-optic deflection means introduced in the above-mentioned paper of The Bell System Technical Journal, July–Aug. issue, 1967.

In the embodiment of FIG. 1, a convergence lens may be interposed between the reflector 106 and the half-silvered mirror 104 so as to suppress the excessive divergence of the beams 117.

Furthermore, the photodiode matrix 570 may be made into a monolithic integrated circuit through the processes of well-known IC techniques. If this modification is introduced, the diode matrix 570 may be divided into two parts, one for the column parallel arrays and the other for the line-parallel arrays. The photoelectric conversion plates respectively having these arrays of the IC-type may be separately placed in the positions of diffraction figures 421 and 422 (FIG. 7), respectively. As shown in FIGS. *9a* and *9b*, the line-parallel arrays 727 are coupled to coincidence detection circuits 581, while the column parallel arrays 728 are coupled in pairs to sensing amplifiers 585 (Diodes 584 and 587 (FIG. 8) for connecting these arrays to circuits 581 and amplifiers 585 are omitted for simplicity). The above-mentioned structures of column-parallel and line-parallel arrays make it possible to separate the functions of the photodiode matrix into its "data searching" phase and "readout" phase.

Finally, it is to be noted that the central data processor not shown is connected to the X-deflecting means 109 and 114 and selective masking means 111 and 116 of FIG. 1 and X-deflecting means 409 and selective masking means 411. These connections have been omitted for simplifying the description.

As will be fully understood from the foregoing, the present invention makes it possible by employing holographic techniques to provide a high-density, high-capacity associative memory system, with the advantages of holography retained such that a number of hologram plates can be reproduced from a single original hologram.

What is claimed is:

1. An associative memory system employing holographic techniques comprising:
 - first and second coherent light beam arrays arranged to form an interference pattern, each array comprising a plurality of spaced parallel coherent light beams;
 - first and second light wave modulators utilized to perform selective masking upon the beams of the first and second arrays, respectively, and each having means for selectively intercepting, in response to data to be stored, selected ones of the parallel coherent light beams of their associated array, said data being different from one to the other of said light wave modulators;
 - means for causing each coherent beam of one of said arrays to diverge in a preselected direction;
 - a photographic plate positioned to record the interference patterns formed between the modulated coherent light beam arrays;
 - at least one of said arrays comprising a plurality of pairs of beams with each beam of said pairs being adapted to form an interference pattern with each beam of the remaining array wherein the light wave modulation at said selected masking means is such that each bit of said data is represented by the presence of only one beam of each pair of said parallel light beams, whereby each bit of information of a first of said data together with its complement is recorded on said photographic plate in the form of an interference pattern with the remaining type of said data.

2. An associative memory system comprising:
 - a coherent light source for producing a pair of coherent light waves travelling in the Z-direction of a rectangular coordinate system made up of the mutually perpendicular directions X, Y and Z;
 - a pair of light wave modulators each assigned to said light wave pairs;
 - a first one of said light wave modulators having first means for discretely shifting the optical path of its associated light wave in the X-direction of said coordinate system, second means for dividing said X-shifted light waves into a plurality of pairs of parallel light beams arranged side by side in the Y-direction of said coordinate system thereby forming a first array;
 - the remaining one of said light wave modulators having first means for discretely shifting the optical path of each of said light waves in the X-direction of said coordinate system and second means for dividing said X-shifted light waves into a plurality of light beams arranged side by side in the Y-direction of said coordinate system thereby forming a second array;
 - said first modulator further comprising means for selectively intercepting at least one beam of each of said pairs of said first array in response to digital data of a first type so that each digit position of the data is represented by the presence of only one beam of the associated pair of parallel beams;
 - the remaining one of said modulators further comprising means for selectively intercepting selected ones of the beams in said second array in response to digital data of a second type so that each digit position of said data is represented by the presence of an associated beam when in a first binary state and is represented by the absence of its associated beam when in the remaining binary state;
 - means for causing one of the modulated outputs of said light wave modulators to diverge within a plane parallel to the YZ plane of said coordinate system;
 - photographic recording means;
 - means for directing the output of said diversions causing means and said light wave modulator unaccompanied by diversions causing means to said photographic means to form a defraction figure thereon, whereby said defraction figure recorded on said recording means consists of a pattern of the binary data of the first type combined with the true value of the binary data of the second type as well as combined with the complementary value of the binary data of the second type.

3. A method of storing and retrieving information employing holographic techniques comprising the steps of:
 - a. generating two coherent light waves travelling in the Z-direction of a rectangular coordinate system comprised of the mutually perpendicular directions X, Y and Z;
 - b. shifting one of said light waves in the X-direction of said coordinate system;
 - c. dividing each of said X-shifted light waves into a first array comprised of a plurality of pairs of light beams arranged side by side in the Y-direction of said coordinate system;
 - d. selectively masking the first array of beams in response to digital data of a first type to be stored in such a manner that only one beam of each of said pairs of beams remains unmasked in accordance with the binary state of the associated bit of the data of said first type;
 - e. shifting the remaining one of said light waves in a X-direction of said coordinate system;
 - f. dividing each of said X-shifted light waves into a second array comprised of a plurality of light beams arranged side by side in the Y-direction of said coordinate system;
 - g. selectively masking the second array in response to digital data of a second type wherein only those beams whose associated bit is a first binary state are passed while the remaining beams whose associated bit are in the opposite binary state are blocked;
 - h. causing the beams of said first and second array to intersect and thereby form an interference pattern;

i. causing a photographic plate to be illuminated by the aforesaid interference pattern which is comprised of the second type of data combined with the true value of the first type of data and further combined with the complementary value of said first type of data.

4. The method of claim 3 further comprising the steps of:

j. developing the exposed plate to fix the interference patterns formed thereon;

k. illuminating the developed plate with a plurality of parallel light beams selectively intercepted in response to interrogation data in such a manner that said light beams represent the complementary value of each digit of interest of said interrogation data; and l. selectively reading out reproduced data from the defraction figure formed by said illumination wherein those positions in which an image is not formed represent the coincidence state.

5. Apparatus for forming a holographic pattern from two space modulated light beams comprising:

first means for generating first and second coherent light beams arranged in parallel and moving in a first direction;

second means responsive to a first group of digital deflection information for shifting said first beam by a predetermined amount in a direction transverse to said first direction;

third means responsive to a second group of digital deflection information for shifting said second beam by a predetermined amount in a direction transverse to said first direction;

fourth means for splitting said shifted first beam into a first array comprising a plurality of first substantially spaced parallel beams arranged along a line transverse to said first direction, each adjacent pair of beams representing the true and complementary state of an associated digit position;

fifth means for splitting said shifted second beam into a second array comprised of a plurality of second substantially spaced parallel beams arranged along a line transverse to said first direction;

sixth means for selectively masking one of said beams of each pair of said first array of beams in accordance with the binary state of each digit of a group of data to be stored;

seventh means for selectively masking the beams of said second array of beams in accordance with the binary state of each digit of a second group of data to be stored;

a photographic plate;

eighth means for selectively combining the first and second arrays of beams at said plate to form a diffraction pattern.

6. The apparatus of claim 5 further comprising threshold means positioned between said eighth means and said plate for preventing passage from one of said first and second plurality of beams not combined with an associated beam of the other of said first and second plurality of beams.

7. An associative readout memory device employing holographic techniques comprising:

a photographic plate having a diffraction pattern comprised of first and second space modulated coherent light waves;

first means responsive to the complementary binary state of preselected interrogation digit positions of an interrogation word for selectively generating a plurality of coherent light waves equal in number to the number of interrogation digit positions;

second means for selectively masking at least one of each pair of waves generated by said first means;

said plate being positioned to intercept said light waves;

third means including a plurality of pairs of devices sensitive to coherent light positioned to intercept coherent waves emitted by said plate;

fourth means coupled to said third means for sensing the interception of no waves by said third means to recognize coincidence between the interrogation word and the pattern being scanned;

fifth means responsive to said fourth means for causing said first and second means to illuminate that portion of the diffraction pattern being coincident with the preselected digits of said interrogation word to cause readout of all digit positions of that pattern portion;

sixth means coupled to said third means for sensing the binary state of all digit positions of the pattern portion readout of said plate.

8. An associative memory system employing holographic techniques comprising:

first means for generating a first coherent light beam array comprised of a plurality of pairs of spaced parallel light beams;

second means for modulating the beams of said first array in accordance with binary input data of a first type to be stored, each binary bit of said data being associated with a respective pair of said beams wherby each coherent light beam of each of said pairs of coherent light beams is the complement of the other in that only one or the other coherent light beam of each pair of beams is passed by said second means in accordance with the state of the associated binary bit;

third means for generating a second array comprised of a plurality of spaced parallel coherent light beams;

fourth means for modulating said second array in accordance with binary input data of a second type to be stored whereby each binary bit is associated with a respective beam and only those coherent light beams whose binary bits are in one binary state are passed by said modulating means while the remaining coherent light beams whose binary bits are in the opposite binary state are blocked by said fourth means;

said third means being arranged to cause the beams of said second array to intersect with the beams of said first array to generate an interference pattern;

a photographic plate sensitive to said interference pattern being positioned so as to record the aforesaid pattern on a preselected portion of said plate, wherein said pattern is comprised of said second array and forms an interference pattern with the first modulated array and with the complement of the first modulated array.

9. The system of claim 8 further comprising:

fifth means for shifting the orientation of the beams of said first array;

sixth means for shifting the orientation of the beams of said second array in a direction transverse, whereby each pattern may be stored at different locations n said plate.

10. The system of claim 8 further comprising fifth means for diverging the beams of said first array so as to cause each beam to strike a large area of said plate.

11. The system of claim 8 wherein data stored in said plate is read out by fifth means for modulating said second array of beams in accordance with the complement of only those binary bits of said second type of data which are of interest, said modulated beams causing images to be generated at those positions which fail to compare with the bits of interest;

a detector matrix of light detection means positioned behind said plate wherein each light detection means is associated with each stored point of said plate for detecting the absence of images at those points along said plate which compare with the binary bits of interest;

sixth means coupled to said matrix for sequentially deflecting the second array to those locations where no image has been formed to cause all of said beams of said second array and their complements to strike said plate and thereby generate the desired data pairs stored therein.